Patented June 26, 1951

2,558,146

UNITED STATES PATENT OFFICE 2,558,146

2 - ISOPROPYLMETHYLAMINOETHYL ESTER OF PHENYLCYCLOPENTYLACETIC ACID AND SALTS THEREOF

Robert Bruce Moffett, Kalamazoo, Mich., assignor to The Upjohn Company, Kalamazoo, Mich., a corporation of Michigan No Drawing. Application May 18, 1950, Serial No. 162,808

3 Claims. (Cl. 260—472)

This invention relates to new compositions of matter which are of value as therapeutic agents, particularly as antispasmodics. More specifically the products of this invention are members of the group consisting of a compound represented by the formula:

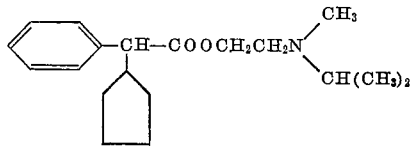

and acid addition salts thereof.

The free basic ester is a colorless, viscous liquid which boils at 145 degrees centigrade at a pressure of 0.15 mm. of mercury. It is readily soluble in the common organic solvents, but is insoluble in water. With acids it reacts to form acid addition salts, more of which are solid crystalline compounds soluble in water. Among the acids suitable for this purpose are inorganic acids such as the hydrogen halides, sulfuric and phosphoric, and organic acids such as acetic, benzoic, citric, tartaric and succinic. Because of the water solubility of the salts it is more convenient to use them instead of the free base. The compounds of this invention are neurotropic antispasmodic agents of a high order of activity, that is, they act upon non-striated muscle tissues to relieve spasm induced by the autonomic nervous system and in this respect their action resembles that of atropine.

The 2-isopropylmethylaminoethyl phenylcyclopentylacetate of this invention can be prepared by condensing the acid chloride of phenylcyclopentylacetic acid with isopropylmethylaminoethanol or by condensing a suitable salt of the acid with a halide of isopropylmethylaminoethanol in a suitable solvent such as benzene, isopropanol, or isopropyl ether. Other methods which are known for the preparation of esters can also be employed. The product can be isolated as the free basic ester or it can be converted to a water-soluble acid addition salt, which is more convenient to use, by treatment with an appropriate acid.

Preparation 1.—Phenylcyclopentylacetyl chloride

A solution of 102.1 grams (0.5 mole) of phenylcyclopentylacetic acid [Kolloff, Hunter, Woodruff and Moffett, J. Am. Chem. Soc., 70, 3862 (1948)] and 75 ml. of thionyl chloride in 75 ml. of dry benzene was warmed on a steam-bath for one-half hour and allowed to stand overnight. After removal of the benzene and excess thionyl chloride, distillation of the residue through a short column gave 101 grams (90.8%) of phenylcyclopentylacetyl chloride as a light yellow liquid distilling at 145 degrees centigrade at a pressure of 12 mm. of mercury; refractive index $n_D^{25}=1.5312$.

Analysis.—Calcd. for $C_{13}H_{15}OCl$: Cl, 15.92. Found: Cl, 15.34.

Preparation 2.—Isopropylmethylaminoethanol

To 512 grams of 90% formic acid (10 moles) was added slowly with cooling 206 grams (2 moles) of isopropylaminoethanol [Hancock and Cope, Org. Syntheses, 26, 38 (1946)] followed by 325 ml. of 37% aqueous formaldehyde. The mixture was heated until carbon dioxide was evolved rapidly and then the source of heat was removed. When the evolution had subsided, the reaction mixture was heated to about 80–90 degrees centigrade for six to eight hours, treated with 1000 ml. of about 4 N hydrochloric acid and concentrated under reduced pressure. To the viscous residue was added 650 ml. of water and 500 ml. of about 18 N sodium hydroxide, the organic layer separated, and the aqueous layer extracted with four 100-ml. portions of benzene. The organic layer and the extracts of the aqueous layer were combined, dried over anhydrous potassium carbonate and the benzene was removed by distillation under slightly reduced pressure. Distillation of the residue under reduced pressure gave 141.5 grams (60.5%) of isopropylmethylaminoethanol boiling at 69 degrees centigrade at a pressure of 23 mm. of mercury; refractive index, $n_D^{25}=1.4379$.

Analysis.—Calcd. for $C_6H_{15}NO$: N, 11.95. Found: N, 11.89.

Example.—2-isopropylmethylaminoethyl phenylcyclopentylacetate

To a solution of 11.1 grams (0.05 mole) of phenylcyclopentylacetyl chloride in 10 ml. of dry benzene was added a solution of 7.0 grams (0.06 mole) of isopropylmethylaminoethanol in 15 ml. of dry benzene and the mixture was heated under reflux for two hours. After cooling, ice water containing a small amount of hydrochloric acid was added, the benzene layer separated, and the aqueous layer extracted twice with ether. After separation the aqueous layer was made basic with sodium hydroxide solution and extracted twice with ether. The extracts were combined, washed twice with water, saturated sodium chloride solution, and dried over anhydrous sodium sulfate. After removal of the ether, distillation of the residual oil under reduced pressure gave 12.0 grams (79%) of 2-isopropylmethylaminoethyl phenylcyclopentylacetate as a colorless liquid distilling at 145 degrees centigrade at a pressure of 0.15 mm. of mercury; refractive index, $n_D^{25}=1.5017$.

*Analysis.*—Calcd. for $C_{19}H_{29}NO_2$: N, 4.62. Found: N, 4.84.

The hydrochloride of the above free base was formed by passing a slight excess of gaseous hydrogen chloride into a solution of 11.5 grams of the free base in 300 ml. of dry ether. The hydrochloride separated as an oil which promptly solidified. After crystallization of the solid from a mixture of ethyl acetate and absolute ether 9.7 grams of 2-isopropylmethylaminoethyl phenylcyclopentylacetate hydrochloride melting at 105–106.5 degrees centigrade was obtained.

*Analysis.*—Calcd. for $C_{19}H_{30}NO_2Cl$: Cl, 10.43. Found: Cl, 10.48.

In a like manner the hydrobromide is obtained. By adding an alcoholic solution of sulfuric, phosphoric, citric or other suitable acid to a solution of the base the sulfate, phosphate, citrate or other salt of the base is obtained.

Although the foregoing specification comprises preferred embodiments of the invention, it is to be understood that the invention is not limited to the exact details shown and described, and that variations and modifications may be made without departing from the scope of the invention as defined in the appended claims.

I claim:

1. A member of the group consisting of a compound having the formula:

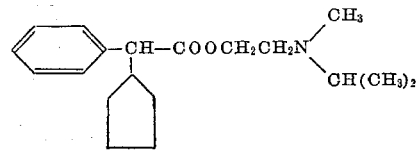

and acid addition salts thereof.

2. 2 - isopropylmethylaminoethyl phenylcyclopentylacetate.

3. 2 - isopropylmethylaminoethyl phenylcyclopentylacetate hydrochloride.

ROBERT BRUCE MOFFETT.

No references cited.